(12) United States Patent
Tiwari et al.

(10) Patent No.: US 12,469,003 B2
(45) Date of Patent: *Nov. 11, 2025

(54) METHOD FOR MAINTAINING PERPETUAL INVENTORY WITHIN A STORE

(71) Applicant: Simbe Robotics, Inc., South San Francisco, CA (US)

(72) Inventors: Durgesh Tiwari, San Francisco, CA (US); Bradley Bogolea, San Francisco, CA (US); Jariullah Safi, San Francisco, CA (US); Kanchan Bahirat, San Francisco, CA (US)

(73) Assignee: Simbe Robotics, Inc., South San Francisco, CA (US)

( * ) Notice: Subject to any disclaimer, the term of this patent is extended or adjusted under 35 U.S.C. 154(b) by 873 days.

This patent is subject to a terminal disclaimer.

(21) Appl. No.: 17/673,094

(22) Filed: Feb. 16, 2022

(65) Prior Publication Data
US 2022/0172156 A1 Jun. 2, 2022

Related U.S. Application Data

(63) Continuation of application No. 17/246,077, filed on Apr. 30, 2021, now Pat. No. 11,288,630.
(Continued)

(51) Int. Cl.
*G01S 7/41* (2006.01)
*G05D 1/00* (2006.01)
(Continued)

(52) U.S. Cl.
CPC ......... *G06Q 10/087* (2013.01); *G05D 1/0094* (2013.01); *G06F 16/906* (2019.01); *G06F 18/21* (2023.01); *G06K 7/1413* (2013.01); *G06K 7/1447* (2013.01); *G06V 20/10* (2022.01); *G06V 20/52* (2022.01); *G01S 7/41* (2013.01); *G06K 2007/10504* (2013.01); *G06K 19/06028* (2013.01)

(58) Field of Classification Search
CPC . G06F 18/21; G06K 7/1447; G06K 19/06028
See application file for complete search history.

(56) References Cited

U.S. PATENT DOCUMENTS 7,693,757 B2 * 4/2010 Zimmerman ........ G05D 1/0274
705/28
9,367,831 B1 * 6/2016 Besehanic ............ G06Q 10/087
(Continued)

*Primary Examiner* — Christle I Marshall
(74) *Attorney, Agent, or Firm* — Run8 Patent Group, LLC; Peter Miller; Leah Raddatz

(57) ABSTRACT

One variation of a method for maintaining perpetual inventory within a store includes: accessing a radar scan of an inventory structure within a store; accessing an optical image of the inventory structure; identifying a product type associated with the slot in a region of the optical image; retrieving a volumetric definition of the product type; locating a slot volume defining the slot in the radar scan; extracting a volumetric representation of a set of product units intersecting the slot volume in the radar scan; segmenting the volumetric representation by the volumetric definition to calculate a quantity of the set of product units occupying the slot; and updating a stock record of the store to reflect the quantity of the set of product units occupying the slot.

14 Claims, 8 Drawing Sheets

Related U.S. Application Data

(60) Provisional application No. 63/017,780, filed on Apr. 30, 2020.

(51) Int. Cl.
| | |
|---|---|
| *G06F 16/906* | (2019.01) |
| *G06F 18/21* | (2023.01) |
| *G06K 7/14* | (2006.01) |
| *G06K 19/06* | (2006.01) |
| *G06Q 10/087* | (2023.01) |
| *G06V 20/10* | (2022.01) |
| *G06V 20/52* | (2022.01) |
| *G06K 7/10* | (2006.01) |

(56) References Cited

U.S. PATENT DOCUMENTS

| | | | |
|---|---|---|---|
| 9,665,848 B1* | 5/2017 | Johnson | G08B 13/2417 |
| 11,288,630 B2* | 3/2022 | Tiwari | G06V 20/52 |
| 11,587,031 B2* | 2/2023 | Nobuoka | H04N 23/60 |
| 2009/0063307 A1* | 3/2009 | Groenovelt | G06Q 10/087 705/28 |
| 2014/0003655 A1* | 1/2014 | Gopalakrishnan | G06Q 10/087 382/103 |
| 2015/0052029 A1* | 2/2015 | Wu | G06Q 10/087 705/28 |
| 2015/0379366 A1* | 12/2015 | Nomura | G06F 18/22 382/203 |
| 2017/0032311 A1* | 2/2017 | Rizzolo | G01C 21/206 |
| 2017/0124508 A1* | 5/2017 | Wasilewsky | G06K 7/1413 |
| 2017/0193434 A1* | 7/2017 | Shah | G06V 20/10 |
| 2017/0286773 A1* | 10/2017 | Skaff | G06N 3/008 |
| 2017/0323251 A1* | 11/2017 | Bode | G06K 7/1413 |
| 2018/0005173 A1* | 1/2018 | Elazary | B25J 13/085 |
| 2018/0293543 A1* | 10/2018 | Tiwari | H04W 4/35 |
| 2020/0013007 A1* | 1/2020 | Bogolea | G06F 18/21 |
| 2020/0074402 A1* | 3/2020 | Adato | G06V 20/52 |
| 2020/0111053 A1* | 4/2020 | Bogolea | G06V 20/10 |
| 2021/0110139 A1* | 4/2021 | Adato | G06V 20/20 |

* cited by examiner

METHOD FOR MAINTAINING PERPETUAL INVENTORY WITHIN A STORE

CROSS-REFERENCE TO RELATED APPLICATIONS

This Application is a continuation of U.S. patent application Ser. No. 17/246,077, filed on 30 Apr. 2021, which claims the benefit of U.S. Provisional Patent Application No. 63/017,780 filed on 30 Apr. 2020, which is incorporated in its entirety by this reference.

TECHNICAL FIELD

This invention relates generally to the field of stock keeping and more specifically to a new and useful method for maintaining perpetual inventory within a store in the field of stock keeping.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
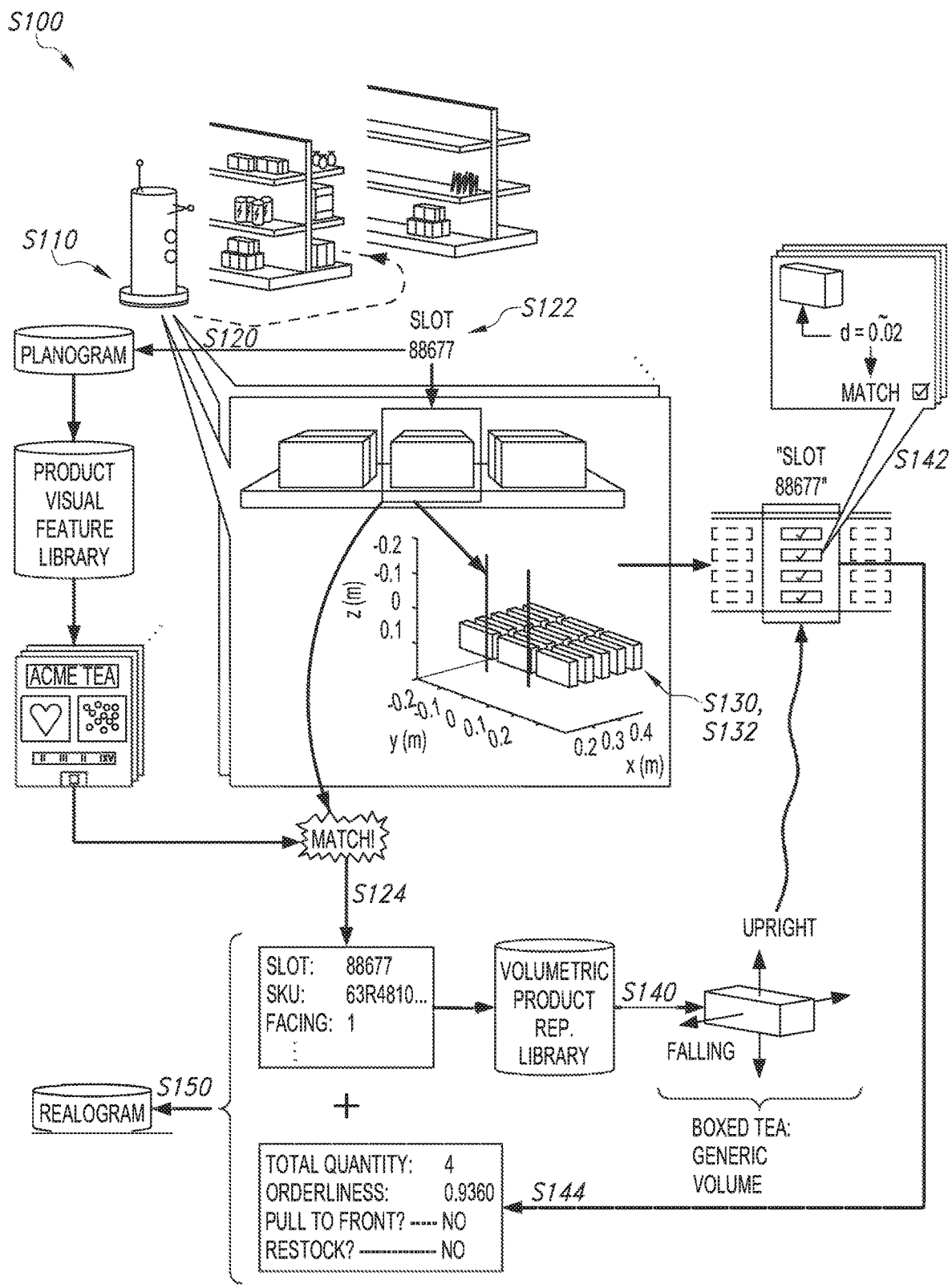
FIG. 1 is a flowchart representation of a method.

As shown in FIG. 1, a method S100 for maintaining perpetual inventory within a store includes: dispatching a robotic system to autonomously navigate throughout a store, to record images of inventory structures within the store, and to record radar scans of inventory structures within the store during a scan cycle in Block S110; accessing an image of an inventory structure captured by the robotic system during the scan cycle in Block S120; detecting a first slot in a first inventory structure depicted in a first segment of a first image in the set of images in Block S122; identifying a first product unit in the first slot as a first product type based on a set of features extracted from the first segment of the first image, the first product type assigned to the first slot in Block S124; aggregating a first set of radar scans captured by the robotic system during the scan cycle into a first composite radar scan in Block S130; delineating a first set of product units in a slot volume of the composite radar scan corresponding to the first slot in Block S132; and retrieving a volumetric definition of the first product type in Block S140. The method S100 also includes, for each product unit in the first set of product units: calculating a nearest alignment of the volumetric definition of the first product type to the volumetric representation of the product unit in the slot volume of the composite radar scan in Block S142; identifying the product unit as a product unit of the first product type in Block S144 in response to a distance between the volumetric definition of the first product type and the volumetric representation of the product unit falling below a threshold distance; and identifying the product unit as a product unit of other than the first product type in Block S144 in response to the distance between the volumetric definition of the first product type and the volumetric representation of the product unit exceeding the threshold distance. The method S100 further includes updating a realogram to reflect product types and quantities of product units occupying the first slot based on the first product unit and product types of the first set of product units in Block S150.

One variation of the method S100 includes: accessing a first radar scan of a first inventory structure within a store in Block S130; accessing a first optical image of the first inventory structure in Block S120; detecting a first slot in a first region of the first optical image in Block S122; extracting a first set of optical features from the first region of the first optical image; identifying a first product type associated with the first slot based on the first set of optical features in Block S124; retrieving a first volumetric definition of the first product type in Block S140, the first volumetric definition representing a product packaging of the first product type; locating a first slot volume defining the first slot in the first radar scan in Block S122; extracting a first volumetric representation of a first set of product units intersecting the first slot volume in the first radar scan in Block S132; segmenting the first volumetric representation by the first volumetric definition to calculate a first quantity of the first set of product units occupying the first slot in Block S144; and updating a stock record of the store to reflect the first quantity of the first set of product units occupying the first slot in Block S150.

Another variation of the method S100 includes: accessing a first radar scan of a first inventory structure within a store in Block S130; accessing a first optical image of the first inventory structure in Block S120; detecting a first product unit, of a first set of product units, occupying a first slot in the first inventory structure, in a first region of the first optical image in Block S122; extracting a first set of optical features of the first product unit from the first region of the first optical image; identifying a first product type of the first product unit based on the first set of optical features in Block S124; retrieving a first volumetric definition of the first product type in Block S140; locating a first slot volume defining the first slot in the first radar scan in Block S122; extracting a first volumetric representation of the first set of product units intersecting the first slot volume in the first radar scan in Block S132; segmenting the first volumetric representation by the first volumetric definition to calculate a first quantity of the first set of product units occupying the first slot in Block S144; and updating a stock record of the store to reflect the first quantity of the first set of product units occupying the first slot in Block S150.

Yet another variation of the method S100 includes: accessing a first radar scan of a first inventory structure within a store in Block S130; accessing a first optical image of the first inventory structure in Block S120; detecting a first shelf tag, associated with a first slot on the inventory structure, in a first region of the first optical image in Block S122; extracting a first product identifier for a first product type, designated by the first shelf tag, from the first region of the first optical image; retrieving a first volumetric definition of the first product type in Block S140; locating a first slot volume defining the first slot in the first radar scan in Block S122; extracting a first volumetric representation of a first set of product units intersecting the first slot volume in the first radar scan in Block S132; segmenting the first volumetric representation by the first volumetric definition to calculate a first quantity of the first set of product units occupying the first slot in Block S144; and updating a stock record for the first slot to reflect the first quantity of the first set of product units occupying the first slot in a realogram of the store in Block S150.

2. Applications

Generally, Blocks of the method S100 can be executed by a computer system: to dispatch a robotic system to capture both images (e.g., 2D photographic images) and radar scans (e.g., millimeter-wave radar line scans) of inventory structures throughout a retail space (e.g., a grocery store); to detect, identify, count, and derive orientations of product units visible in images of these inventory structures; to approximate types and quantities of product units stocked in these inventory structures—but not visible in these images—based on these radar scans; and to assemble these image-based and radar-based product type and product quantity data into a (more) complete representation of the total inventory state of the store.

For example, the computer system (e.g., a remote server, a computer network) can selectively dispatch a robotic system to image and scan inventory structures throughout a store, such as: once per day prior to a scheduled restocking period during low-traffic or closed hours at the store; or on multiple occasions per day based on sale rate at the store. The computer system can then implement methods and techniques described in U.S. patent application Ser. No. 15/600,527 to: identify a region of an image—captured by the robotic system during a scan cycle—depicting a slot in an inventory structure; extract a set of features from the region of the image; identify product types of one or a set of product units depicted (i.e., visible) in this region of the image; estimate orientations of these product units based on positions of features on these product units depicted in this region of the image; and thus verify whether a target quantity of facings of a particular product type assigned to this slot is present in this slot and whether these product units are properly ordered (e.g., not overturned) in the slot.

However, these outermost product units that are visible in this region of the image and/or adjacent shelves of the inventory structure may obfuscate other product units occupying this slot. Therefore, the computer system can execute Blocks of the method S100 to: aggregate discrete radar line scans captured by the robotic system while traversing this inventory structure into a composite radar scan of the inventory structure; define a slot volume (i.e., a 3d region) in the composite radar scan corresponding to the slot; detect a set of product units in this slot volume of the composite radar scan; retrieve a volumetric definition of a product type assigned to this slot; identify a first subset of product units—in this set of product units—that define boundaries substantially similar to the volumetric definition of the product type; and identify a second subset of product units—in this set of product units—that define boundaries substantially dissimilar to the volumetric definition of the product type. The computer system can then annotate a representation of the slot in a realogram of the store (or spreadsheet or other stock keeping system) with: the quantity of product units of the product type assigned to the slot; the quantity of product units of product types not assigned to the slot; and a quantity of facings of the product type in the slot.

The computer system can thus fuse image and radar scan data to derive a stock condition of the slot—including types and quantities of product units occupying the slot—and prompt a store associate to restock this slot when this stock condition deviates sufficiently from a target condition. The computer system can also derive orientations of product units occupying this slot from these scan data, characterize an orderliness of the slot from this product unit orientations, and then prompt a store associate to reorder this slot when orderliness of the slot deviates sufficiently from the target condition. The computer system can then repeat this process for each other slot in the store in order to track true inventory states of these slots and to generate and distribute restocking and reordering prompts to store associates accordingly, thereby enabling these store associates to maintain a target inventory state throughout the store over time.

The method S100 is described herein as executed by a computer system—remote from the robotic system—to derive true inventory states of a slot on a shelf in an inventory structure from an image and radar scans of the inventory structure. However, Blocks of the method S100 can additionally or alternatively be executed by the remote computer system or other computer system within the store. Additionally or alternatively, Blocks of the method S100 can be executed by the computer system, etc. to derive inventory states of refrigeration units, produce displays, promotional displays, hang-down product displays, etc.

3. System

Figure 2:
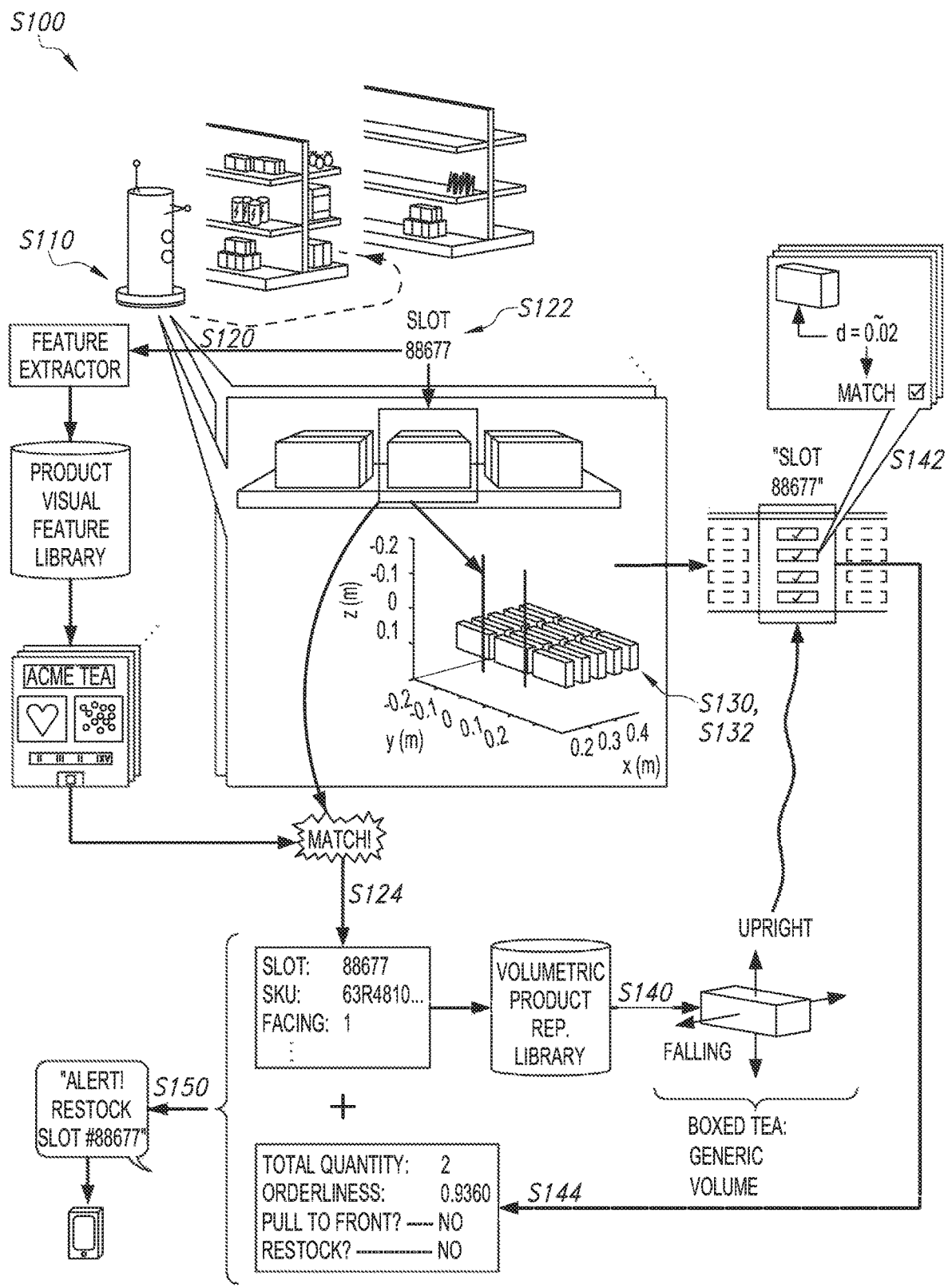
FIG. 2 is a flowchart representation of one variation of the method.
Figure 3:
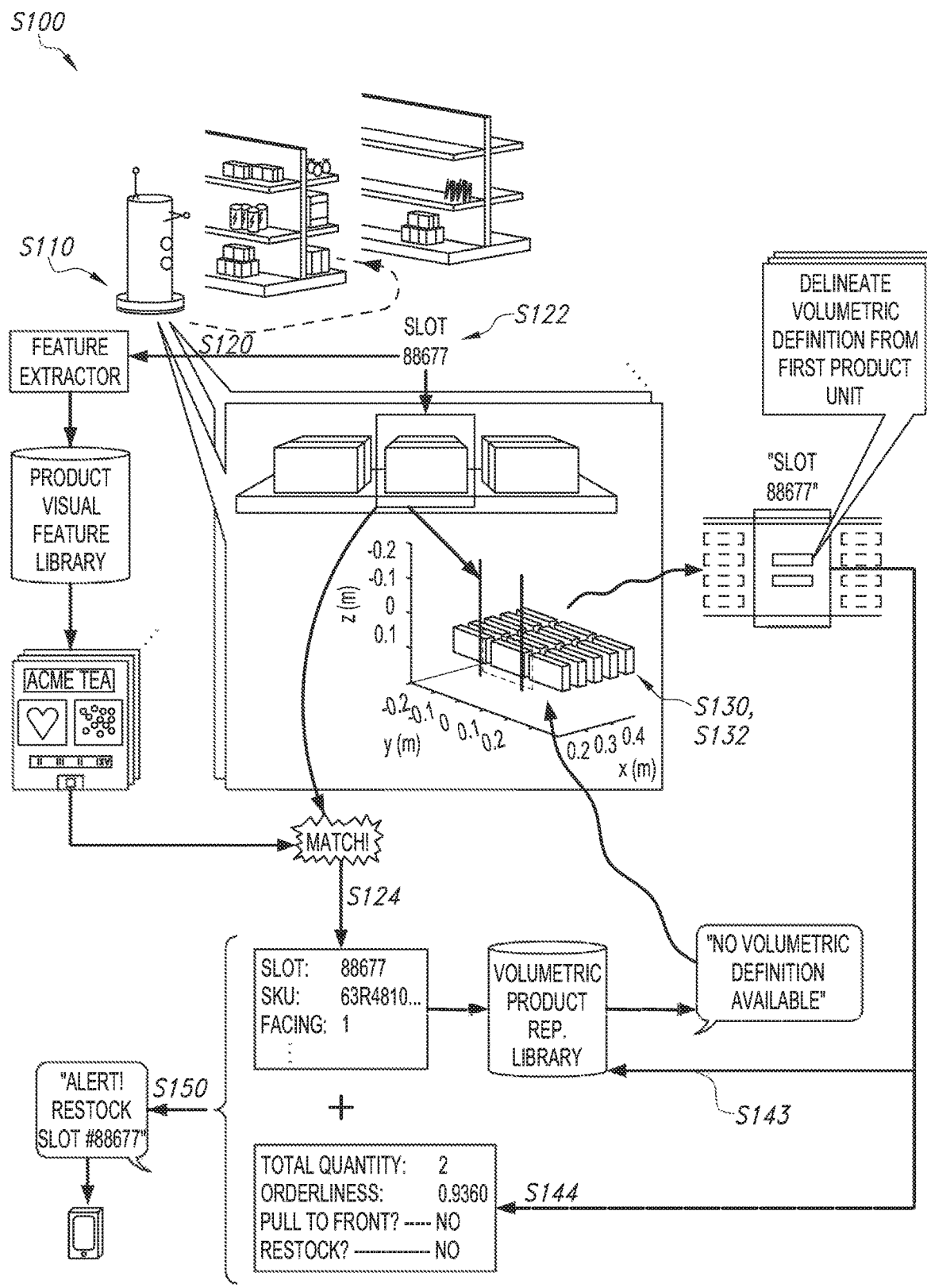
FIG. 3 is a flowchart representation of one variation of the method.
Figure 4:
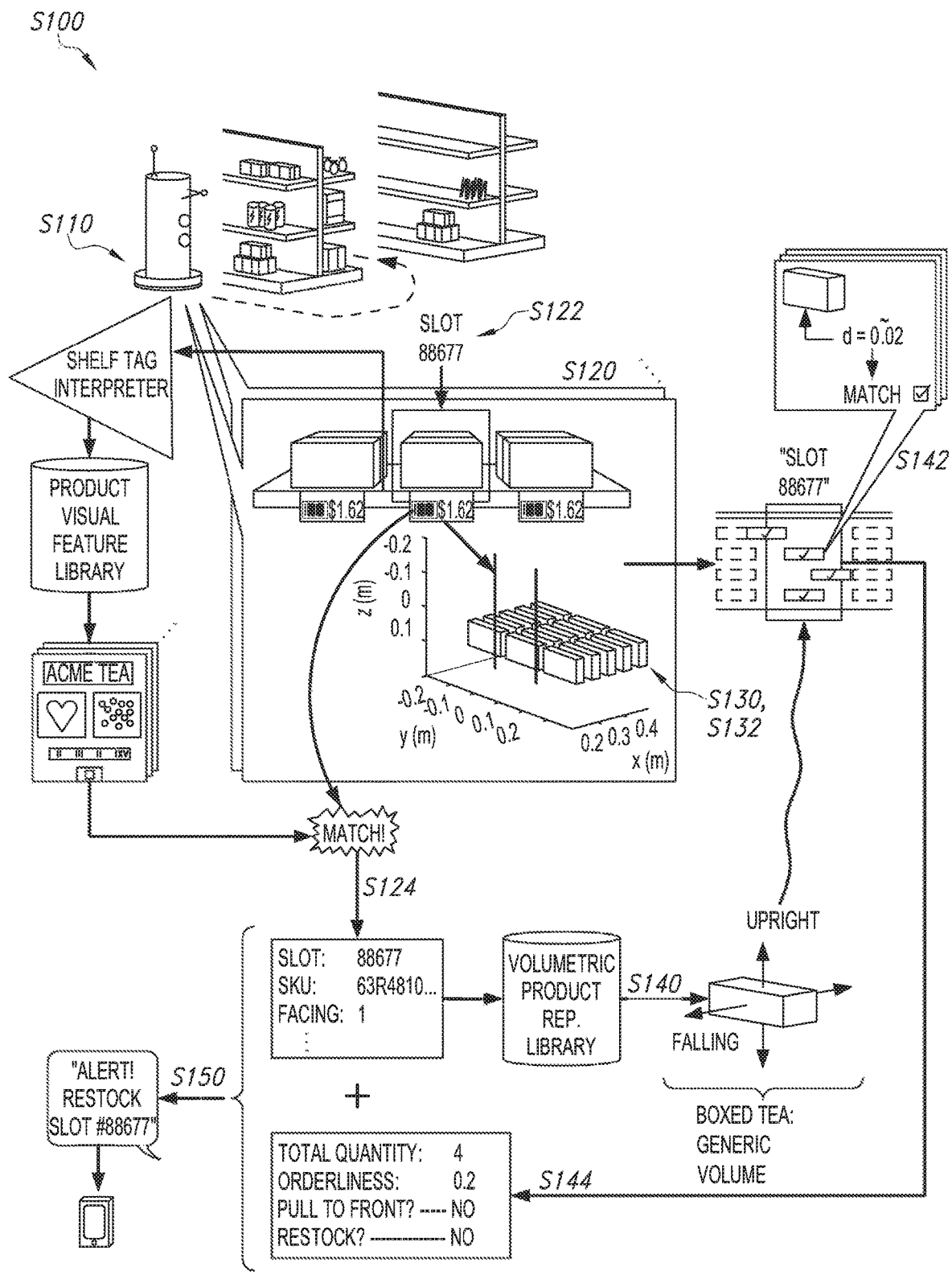
FIG. 4 is a flowchart representation of one variation of the method.
Figure 5:
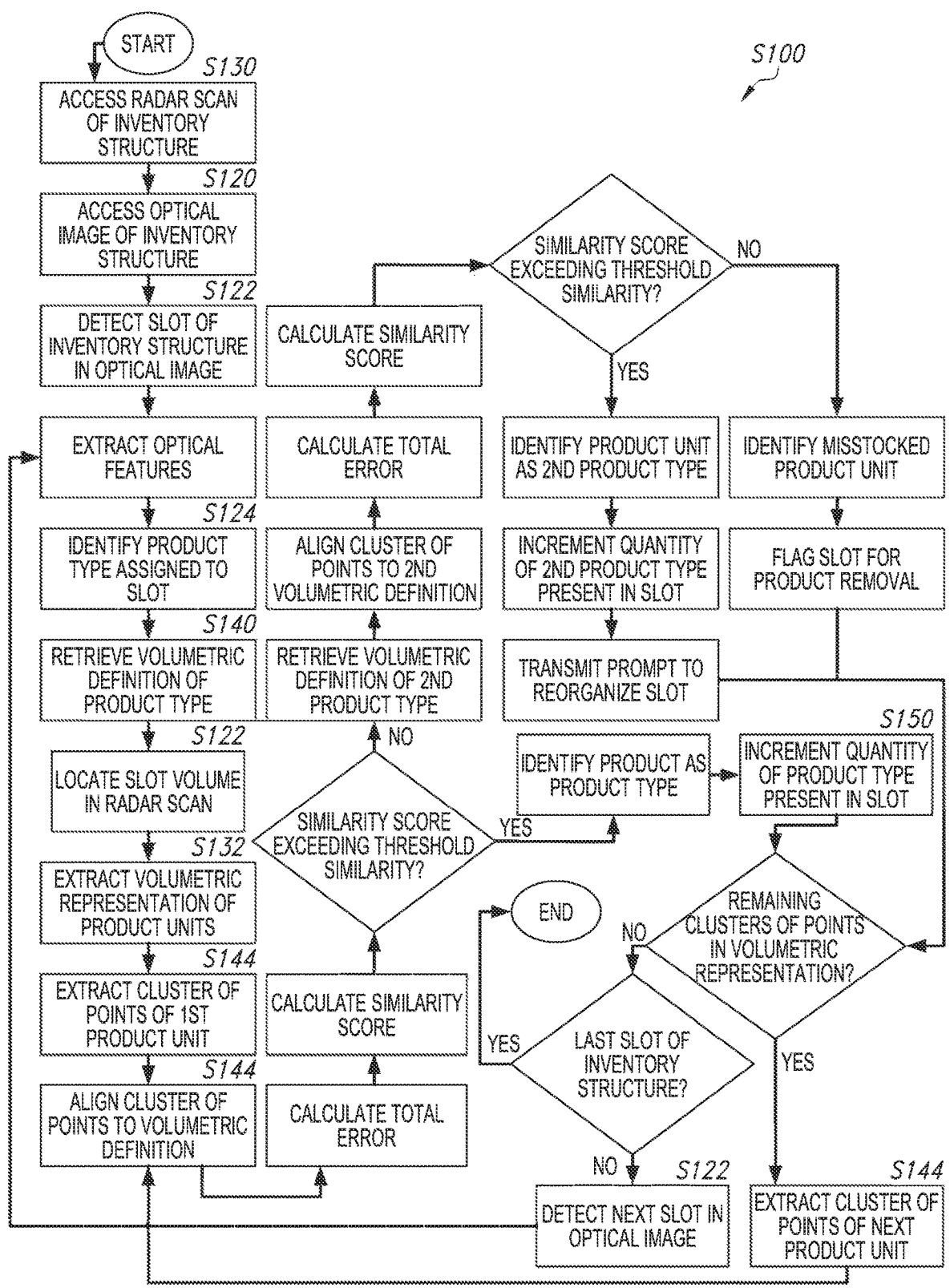
FIG. 5 is a flowchart representation of one variation of the method.
Figure 6:
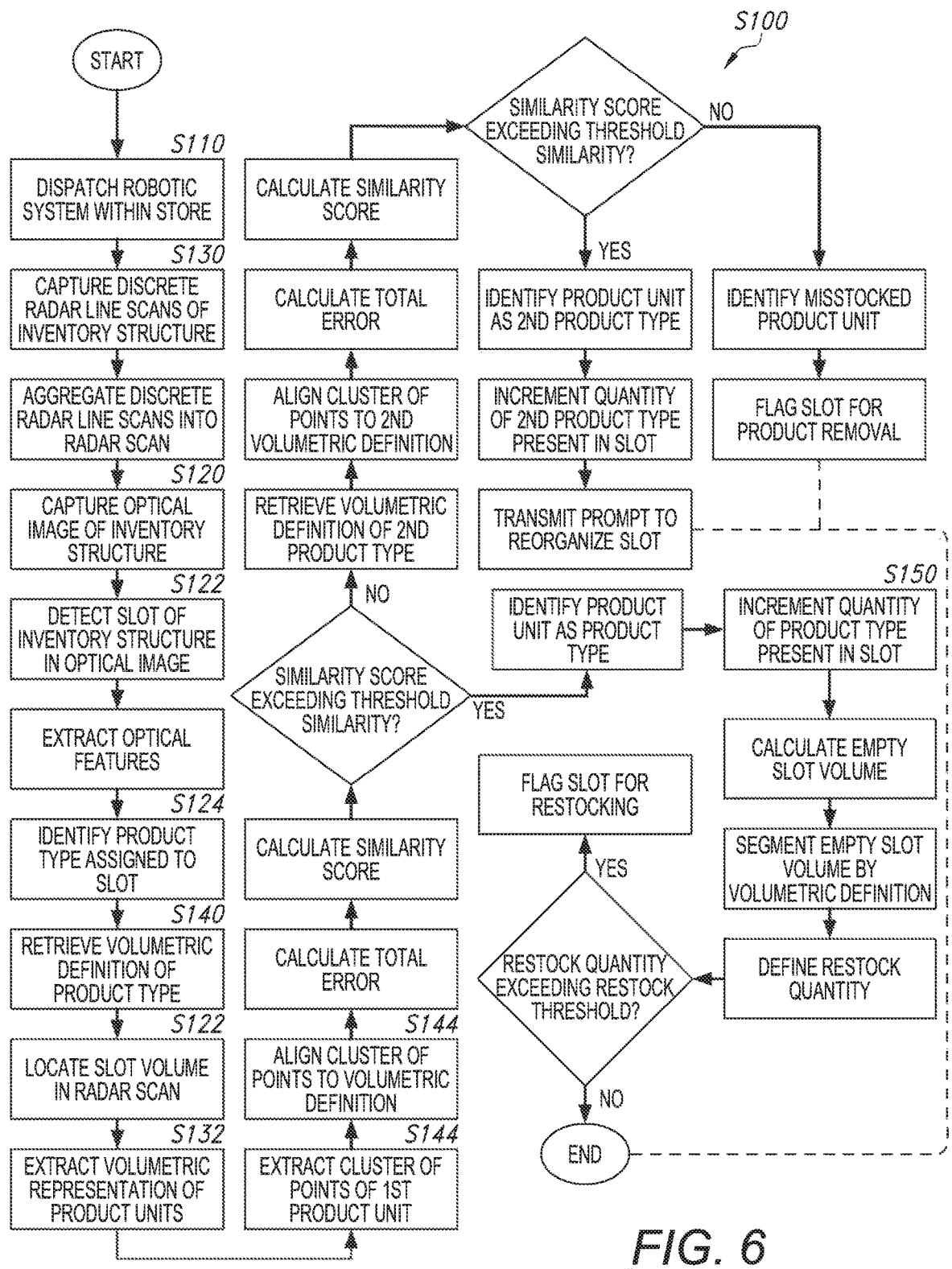
FIG. 6 is a flowchart representation of one variation of the method.
Figure 7:
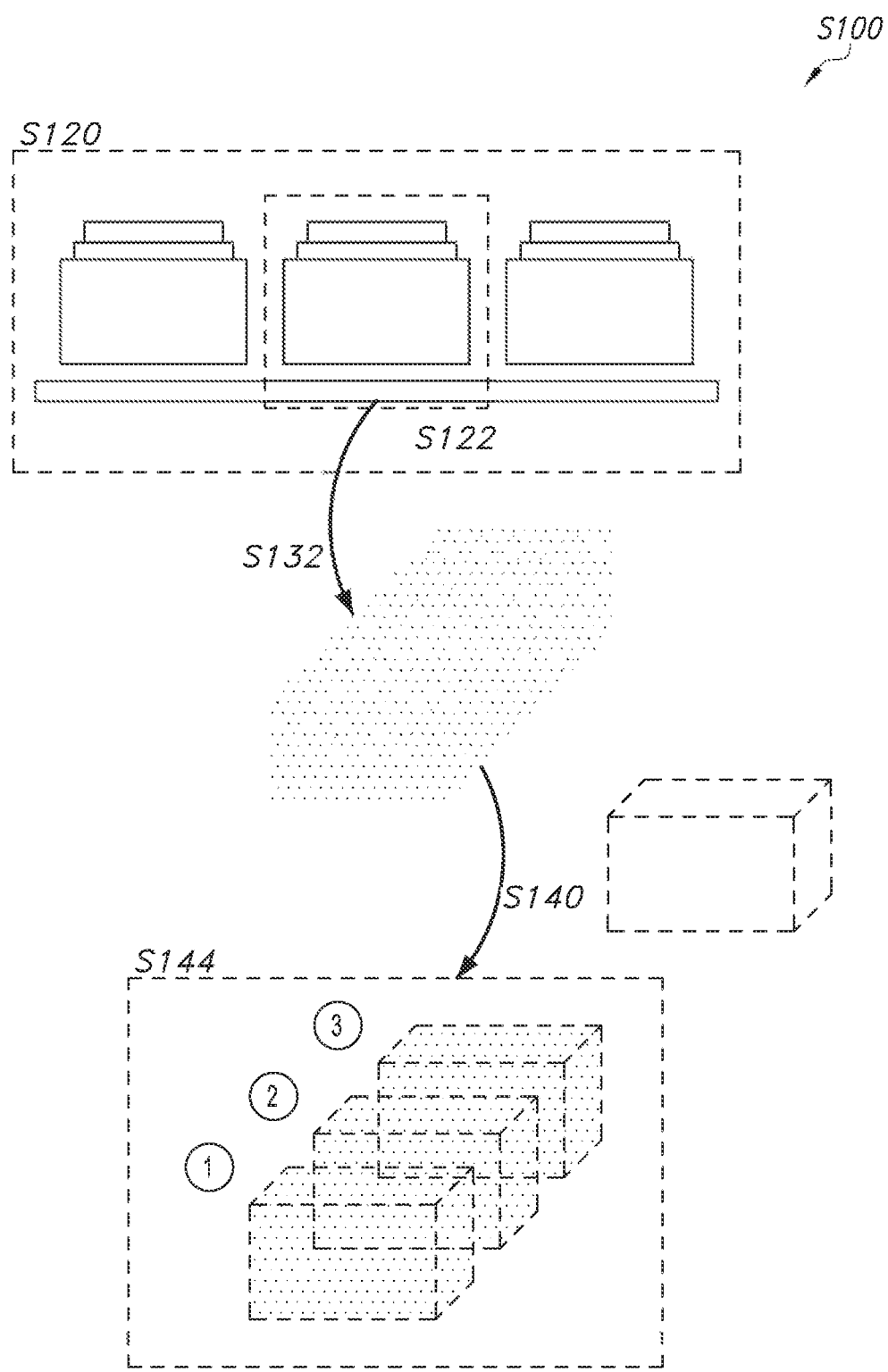
FIG. 7 is a flowchart representation of one variation of the method.
Figure 8:
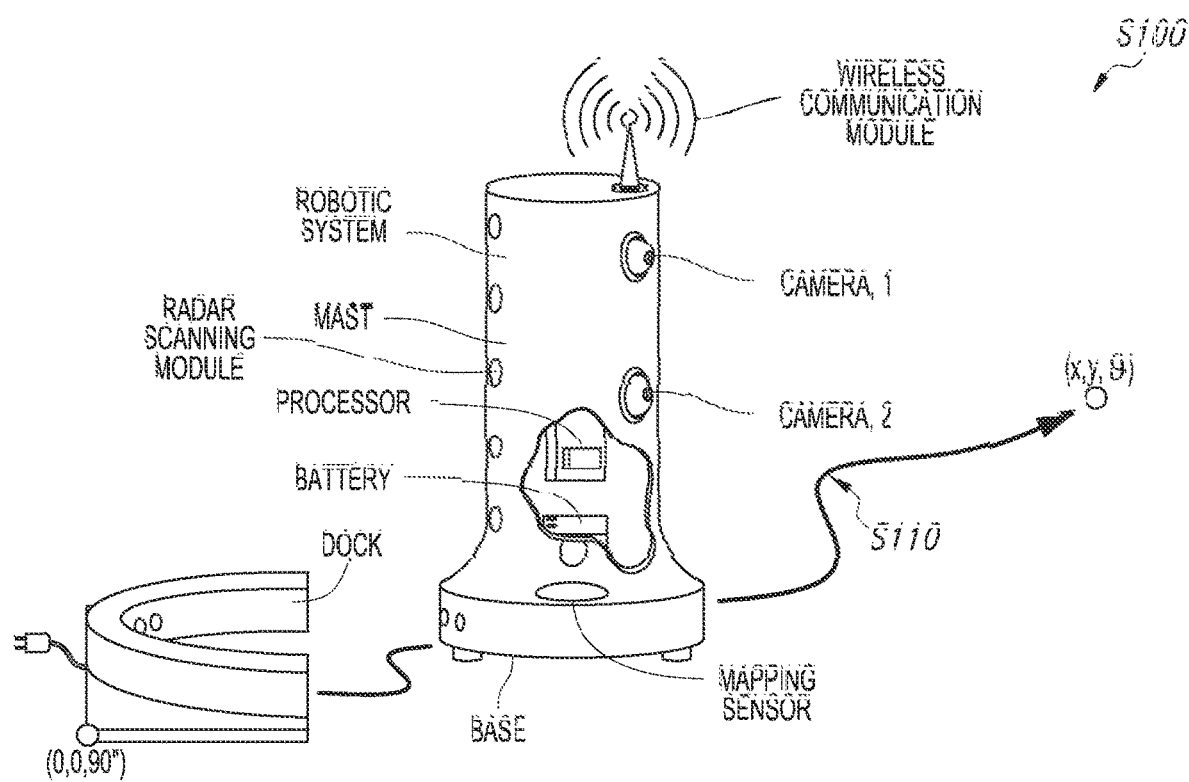
FIG. 8 is a schematic representation of one variation of the method.

As shown in FIG. 2, a robotic system autonomously navigates throughout a store and records images—such as photographic images of packaged goods and/or depth images of inventory structures—continuously or at discrete predefined waypoints throughout the store during a scan cycle. Generally, the robotic system can define a network-enabled mobile robot configured to autonomously: traverse a store; capture photographic (e.g., color, black-and-white) and/or depth images of shelving structures, shelving segments, shelves, slots, or other inventory structures within the store; and upload those images to the computer system for analysis, as described below.

In one implementation shown in FIG. 2, the robotic system defines an autonomous imaging vehicle including: a base; a drive system (e.g., a pair of two driven wheels and two swiveling castors) arranged in the base; a power supply (e.g., an electric battery); a set of mapping sensors (e.g., fore and aft scanning LIDAR systems configured to generate depth images); a processor that transforms data collected by the mapping sensors into two- or three-dimensional maps of a space around the robotic system; a mast extending vertically from the base; a set of photographic cameras arranged on the mast; and a wireless communication module that downloads waypoints and a master map of a store from a computer system (e.g., a remote server) and that uploads photographic images captured by the photographic camera and maps generated by the processor to the computer system, as shown in FIG. 2. In this implementation, the robotic system can include photographic cameras mounted to the mast, such as a first vertical array of (e.g., two, six) photographic cameras on a left side of the mast and a second vertical array of photographic cameras on the right side of the mast, as shown in FIG. 2. The robotic system can additionally or alternatively include articulable photographic cameras, such as: one photographic camera mounted to a first vertical scanning actuator on the left side of the mast; and one photographic camera mounted to a second vertical scanning actuator on the right side of the mast. The robotic system can also include a zoom lens, a wide-angle lens, or any other type of lens on each photographic camera. However, the robotic system can define any other form, can include any other quantity or combination of color, depth, infrared, or other optical sensors, and can autonomously navigate through a store according to any other navigation and mapping techniques.

Furthermore, the robotic system can include a radar scanning module, such as a millimeter-wave radar line array configured to output columnar radar scans that represent distances from the radar line array to surfaces within a narrow columnar field of view. For example, the robotic system can include a millimeter-wave radar line array arranged vertically on the mast, facing outwardly from the mast, and defining a field of view approximately parallel to a field of view of an adjacent color camera on the mast. In particular, the radar scanning module can operate at RF wavelengths in the millimeter and/or sub-millimeter range, which may penetrate paper, cardboard, plastic, and other common product packaging materials. By detecting reflections and phase shifts of these millimeter and/or sub-millimeter RF waves, the radar scanning module can detect surfaces over a range of depths within its field of view.

Furthermore, the radar scanning module can include a column of radar emitters and receivers that define a columnar field of view. During one radar scan cycle, the radar scanning module can synchronize emission of RF signals from these emitters and can compile reflection and phase shift data collected by these receivers into a columnar 2D radar scan (or "slice") representing depths of surfaces within this columnar field of view. The radar scanning module (or the remote computer system) can also implement tomographic to compile several radar scans—captured over multiple radar scan cycles at the robotic system moves along one inventory structure—into a 3D radar scan of this inventory structure based on known movements of the robotic system.

In one variation, multiple robotic systems can be deployed in a single store and can be configured to cooperate to image shelves and product units within the store. For example, two robotic systems can be deployed to a large single-floor retail store and can cooperate to collect images of all shelves and inventory structures in the store within a threshold period of time (e.g., within one hour). In another example, one robotic system is deployed on each floor of a multi-floor store, and each robotic system collects images of shelves and inventory structures on its corresponding floor. The computer system can then aggregate photographic images and radar scans captured by these robotic systems deployed in this store to generate a graph, map, table, and/or task list for managing distribution and restocking of product throughout the store.

4. Hierarchy and Terms

A "store" is referred to herein as a (static or mobile) facility containing one or more inventory structures.

A "product" is referred to herein as a type of loose or packaged good associated with a particular product identifier (e.g., a SKU) and representing a particular class, type, and varietal. A "unit" or "product unit" is referred to herein as an instance of a product—such as one bottle of detergent, one box of cereal, or package of bottle water—associated with one SKU value.

A "product facing" is referred to herein as a side of a product designated for a slot.

A "volumetric definition" is referred to herein as a known product volume defined by packaging surfaces (e.g., a rectangular box, a cylindrical can) for an individual product unit of a particular product type. The volumetric definition can be defined by a manufacturer and/or supplier of the product type and can be stored in a volumetric definition library accessible by the system. Additionally or alternatively, the mobile robotic system can capture a radar scan of a shelf during a scan cycle; and the computer system can generate a volumetric definition for a particular product type based on a volumetric representation of a product unit of the particular product type—occupying the shelf—extracted from the radar scan, such as if a volumetric definition for the particular product type is not extant in the product database during or after the scan cycle. In Block S143, the computer system can then store the generated volumetric definition for the particular product type in the volumetric definition library.

A "volumetric representation" is referred to herein as a detected volume of a set of product units occupying a slot in a radar scan. The volumetric representation can include a volume of an individual product unit or of multiple product units grouped together in the slot (e.g., a front product unit and multiple product units arranged behind the front product unit).

A "slot" is referred to herein as a section (or a "bin") of a shelf on an "inventory structure" designated for storing and displaying product units of the product type (i.e., of the same SKU or CPU). An inventory structure can include a shelving segment, a shelving structure, or other product display containing one or more slots on one or more shelves.

A "planogram" is referred to herein as a plan or layout designating display and stocking of multiple product facings across multiple slots, such as: in a particular shelving segment; across a particular shelving structure; across multiple shelving structures within a particular aisle; across multiple aisles in the store; or throughout the entirety of the store. In particular, the planogram can specify a target product type, a target product placement, a target product quantity, a target product quality (e.g., ripeness, time to peak ripeness, maximum bruising), and/or a target product orientation for a fully-stocked slot for each slot represented in the planogram. For example, the planogram can define a graphical representation of an inventory structure in the store, including graphical representations of each slot in this inventory structure, each populated with a quantity of graphical representations of product type assigned to this slot equal to a quantity of product facings assigned to this slot. Alternatively, the planogram can record textual product placement for one or more inventory structures in the store in the form of a spreadsheet, slot index, or other database.

Furthermore, a "realogram" is referred to herein as a representation of the actual products, actual product placement, actual product quantity, and actual product orientation of products and product units throughout the store during a scan cycle, such as derived by the computer system according to Blocks of the method S100 based on photographic images and/or other data recorded by the robotic system while autonomously executing scan cycles in the store.

The method S100 is described herein as executed by a computer system (e.g., a remote server, a computer network) remote from the robotic system. However, Blocks of the method S100 can be executed locally by one or more robotic systems deployed in a retail space (or store, warehouse, etc.), by a local computer system (e.g., a local server), or by any other computer system.

5. Robotic System Deployment and Scan Cycle

Block S110 of the method S100 recites dispatching a robotic system to autonomously navigate throughout a store and to record images of inventory structures within the store during a scan cycle. Generally, in Block S110, the computer system can dispatch the robotic system to autonomously navigate along a preplanned sequence of waypoints or along a dynamic path and to record photographic images and radar scans (and/or depth images) of inventory structures throughout the store.

5.1 Scan Cycle: Waypoints

In one implementation, the computer system: defines a set of waypoints specifying target locations within the store through which the robotic system navigates and captures images of inventory structures throughout the store during a scan cycle; and intermittently (e.g., twice per day) dispatches the robotic system to navigate through this sequence of waypoints and to record images of inventory structures nearby during a scan cycle. For example, the robotic system can be installed within a store; and the computer system can dispatch the robotic system to execute a scan cycle during store hours, including navigating to each waypoint throughout the store and collecting data representative of the inventory state of the store in near real-time as patrons move throughout the store. During this scan cycle, the robotic system can: record a sequence of radar scans (e.g., at a rate of 10 Hz) while navigating from one waypoint to a next waypoint; record a photographic (e.g., color, black-and-white) image of an inventory structure upon reaching a next waypoint; and repeat this process for each subsequent waypoint scheduled for this scan cycle. The robotic system can then upload these photographic images and radar scans to the computer system, such as in real-time or upon conclusion of the scan cycle. The computer system can then: detect types and quantities of packaged goods stocked in slots on inventory structures in the store based on data extracted from these photographic images and radar scans; and aggregate these data into a realogram of the store.

The computer system can therefore maintain, update, and distribute a set of waypoints to the robotic system, wherein each waypoint defines a location within a store at which the robotic system is to capture one or more images from the integrated cameras. In one implementation, the computer system defines an origin of a two-dimensional Cartesian coordinate system for the store at a charging station—for the robotic system—placed in the store, and a waypoint for the store defines a location within the coordinate system, such as a lateral ("x") distance and a longitudinal ("y") distance from the origin. Thus, when executing a waypoint, the robotic system can navigate to (e.g., within three inches of) a (x,y) coordinate of the store as defined in the waypoint. For example, for a store that includes shelving structures with four-foot-wide shelving segments and six-foot-wide aisles, the computer system can define one waypoint laterally and longitudinally centered—in a corresponding aisle—between each opposite shelving segment pair. A waypoint can also define a target orientation, such as in the form of a target angle ("∂") relative to the origin of the store, based on an angular position of an aisle or shelving structure in the coordinate system. When executing a waypoint, the robotic system can orient to (e.g., within 1.5° of) the target orientation defined in the waypoint in order to align the suite of photographic and depth cameras to an adjacent shelving structure or inventory structure.

When navigating to a next waypoint, the robotic system can scan its environment with the same or other depth sensor (e.g., a LIDAR sensor, as described above), compile depth scans into a new map of the robotic system's environment, determine its location within the store by comparing the new map to a master map of the store defining the coordinate system of the store, and capture a sequence of radar scans while navigating to a position and orientation within the store at which the output of the depth sensor aligns—within a threshold distance and angle—with a region of the master map corresponding to the (x,y,∂) location and target orientation defined in this next waypoint.

In this implementation, before initiating a new scan cycle, the robotic system can download—from the computer system—a set of waypoints, a preferred order for the waypoints, and a master map of the store defining the coordinate system of the store. Once the robotic system leaves its dock at the beginning of a scan cycle, the robotic system can repeatedly sample its integrated depth sensors (e.g., a LIDAR sensor) and construct a new map of its environment based on data collected by the depth sensors. By comparing the new map to the master map, the robotic system can track its location within the store throughout the scan cycle. Furthermore, before navigating to a next scheduled waypoint, the robotic system can confirm completion of the current waypoint based on alignment between a region of the master map corresponding to the (x,y,∂) location and target orientation defined in the current waypoint and a current output of the depth sensors, as described above.

However, the robotic system can implement any other methods or techniques to navigate to a position and orientation in the store that falls within a threshold distance and angular offset from a location and target orientation defined by a waypoint.

5.2 Scan Cycle: Dynamic Path

In another implementation, during a scan cycle, the robotic system can autonomously generate a path throughout the store and execute this path in real-time based on: obstacles (e.g., patrons, spills, inventory structures) detected nearby; priority or weights previously assigned to inventory structures or particular slots within the store; and/or product sale data from a point-of-sale system connected to the store and known locations of products in the store, such as defined in a planogram; etc.

In this implementation, the robotic system can then continuously capture photographic images, radar scans, and/or depth images (hereinafter "scan data") of inventory structures in the store (e.g., at rates of 10 Hz, 20 Hz, 24 Hz). However, in this implementation, the robotic system can capture images and radar scans of inventory structures within the store at any other frequency during a scan cycle.

5.3 Scan Cycle Scheduling

In one implementation, the robotic system continuously navigates and captures scan data of inventory structures within the store; when a state of charge of a battery in the robotic system drops below a threshold state, the robotic system can return to a charging station to recharge before resuming autonomous navigation and data capture throughout the store.

Alternatively, the computer system can schedule the robotic system to execute intermittent scan cycles in the store, such as: twice per day during peak store hours (e.g., 11 AM and 6 PM on weekdays) in order to enable rapid detection of inventory state changes as patrons remove, return, and/or move products throughout the store; and/or every night during close or slow hours (e.g., 1 AM) to enable detection of inventory states and systematic restocking of understocked slots in the store before the store opens the following morning or before a next peak period in the store.

However, the computer system can dispatch the robotic system to execute scan cycles according to any other fixed or dynamic schedule.

6. Image Access

Block S120 of the method S100 recites accessing an image of an inventory structure captured by the robotic system during the scan cycle. Generally, the robotic system can return images (e.g., photographic images and radar scans) recorded during the scan cycle to a remote database, such as in real-time during the scan cycle, upon completion of the scan cycle, or during scheduled upload periods within the scan cycle. The computer system can then access these images from this database in Block S120 before processing these images according to Blocks of the method S100 described below.

In one implementation, the computer system processes individual photographic images according to the method S100 in order to identify product units depicted in these individual images. Alternatively, the computer system can: stitch multiple photographic images into one composite photographic image representing a greater length of one inventory structure (or greater length of multiple adjacent inventory structures); and then process this "composite" photographic image according to methods and techniques described below.

In one implementation, the computer system accesses both optical images (e.g., color photographic images) and radar scans captured by the robotic system during a scan cycle. In particular, the computer system can dispatch a robotic system to autonomously navigate along a first inventory structure within the store during a first scan cycle. The robotic system can then: capture a first optical image of the first inventory structure; capture a first sequence of discrete radar line scans of the first inventory structure; and aggregate the first sequence of radar line scans into the first radar scan of the first inventory structure in Block S130. Additionally or alternatively, the computer system can aggregate the first sequence of radar line scans into the first radar scan of the first inventory structure in Block S130.

7. Image-Based Product Identification

Block S122 of the method S100 recites detecting a first slot in a first inventory structure depicted in a first segment of a first image in the set of images; and Block S124 of the method S100 recites identifying a first product unit in the first slot as a first product type based on a set of features extracted from the first segment of the first image, the first product type assigned to the first slot. Generally, in Blocks S122 and S124, the computer system can implement methods and techniques described in U.S. patent application Ser. No. 15/600,527 to identify a visible product unit depicted in a photographic image of an inventory structure captured by the robotic system during the scan cycle.

In particular, the computer system can: access a first optical image of the first inventory structure in Block S120; detect a first slot in a first region of the first optical image in Block S122; extract a first set of optical features from the first region of the first optical image; and identify a first product type associated with the first slot based on the first set of optical features in Block S124. Thus, the computer system can: identify the locations of product types on an inventory structure in a store based on an optical image; link this information with data gathered from a radar scan of the inventory structure; and derive a stock condition of the product types on the inventory structure.

7.1 Image Segmentation and Shelf Detection

In one implementation, the computer system: selects a photographic image (or a composite image) of an inventory structure; detects a set of features in the photographic image; extracts—from this set of features—a first linear feature nearest a bottom of the image and extending laterally across (substantially a full width of) the photographic image; extracts—from this set of features—a second linear feature extending laterally across (substantially the full width of) the photographic image and offset above the first linear feature by a distance approximating a common or known shelf face height of inventory structures throughout the store; and defines a first shelf face region between the first linear feature and the second linear feature in the image. In this implementation, the computer system can similarly: extract—from this set of features—a third linear feature extending laterally across the photographic image and offset above the second linear feature (e.g., by a height greater than a package height of a tallest product assigned to the first shelf in this inventory structure by the planogram of the store); extract—from this set of features—a fourth linear feature extending laterally across the photographic image and offset above the third linear feature by a distance approximating the common or known shelf face height; and define a second shelf face region between the third linear feature and the fourth linear feature in the image. The computer system can repeat this process to define shelf face regions around other shelf faces depicted in this image.

In the foregoing example, the computer system can also define a first product region extending from proximal the second linear feature to proximal the third linear feature above and extending across the full width of the photographic image. In particular, the computer system can thus define a first product region—depicting product units occupying this first shelf in the inventory structure—in this image. The computer system can repeat this process for each other shelf in the inventory to define a set of product regions from this image, each depicting product units occupying one shelf in the inventory structure.

The computer system can then: retrieve or generate a realogram for this inventory structure; and populate this realogram with representations of shelf faces and adjacent product regions thus detected in the image of this inventory structure.

However, the computer system can implement any other method or technique to segment this image of the inventory structure into regions depicting shelf faces and regions depicting products occupying volumes between shelf faces in this inventory structure.

7.2 Shelf Tag Detection

The computer system can then scan a shelf face region in the image for a shelf tag and extract product information—of a product type assigned to the corresponding slot—from this shelf tag.

In one implementation, the computer system scans laterally across a first shelf face region—extracted from the image—for a barcode. Upon detecting a barcode in this first shelf face region, the computer system can: decode the barcode for a product identifier; query a product database for product information (e.g., a SKU value, a product description, and current product pricing) linked to this product identifier; read a slot address directly from the first shelf tag containing this barcode or by querying the planogram for a slot address linked to this barcode; and read a price value from the first shelf face region.

7.3 Slot Delineation

The computer system can then delineate slots in the first product region—above the first shelf face region—in this image.

In one implementation, the computer system extracts a first set of optical features (e.g., color, geometry, text) from a first region of a first optical image by: detecting a first shelf of a first inventory structure within the first region of the first optical image; detecting a first shelf tag, positioned on the first shelf, in the first region of the first optical image; and extracting a first product identifier from the first shelf tag detected in the first region of the first optical image. The computer system can then detect a first slot on the inventory structure by defining the first slot on the inventory structure based on a position of the first shelf tag detected in the first optical image. Accordingly, the computer system can identify the first product type associated with the first slot based on the first set of optical features by identifying the first product type based on the first product identifier.

In one example, the computer system can define a first slot boundary: extending vertically from a top edge of the first shelf face region to a bottom edge of the second shelf face region—above the first shelf face—in the image; defining a left edge extending vertically upward from proximal an upper-left corner of the first shelf tag detected in the first shelf face region in the image; and defining a right edge extending vertically upward from proximal an upper-left corner of a second shelf tag—adjacent and to the right of the first shelf tag—detected in the first shelf face region in the image.

The computer system can then repeat this process for each other shelf tag and shelf tag region detected in the image.

However, the computer system can implement any other method or technique to detect a shelf tag, to retrieve product linked to this shelf tag, to define a slot associated with this shelf tag, and to link this shelf tag and corresponding product details to this slot.

Alternatively, the computer system can project slot boundaries—defined in a planogram of the inventory structure—onto the image to directly define a set of slots in the image and then retrieve product details assigned to each slot by the planogram.

7.4 Product Unit Identification

The computer system can then implement methods and techniques described in U.S. patent application Ser. No. 15/600,527 to: scan within and around each slot region thus defined in the image for virtual features representative of product units; identify product units occupying these slots on the inventory structure based on features extracted from within and around this slot regions in the image depicting; and aggregate types and quantities of these product units identified in these slot regions into an inventory state of the inventory structure. For example, the computer system can represent types and quantities of product units detected in each slot in this inventory structure in graphical representations of these slots in the realogram of this inventory structure.

In one implementation described above, the computer system can define a set of slots along the lateral span of this first shelf detected in the image, wherein each slot in this set: defines a bottom-left corner proximal one shelf tag or barcode detected on the shelf; extends rightward up above a left edge of an adjacent slot proximal a next shelf tag or barcode detected on the shelf; and extends upward to the bottom of the adjacent shelf in this inventory structure. Then, for a first slot on the first shelf, the computer system can: decode a first shelf tag or barcode—depicted on the face of the shelf adjacent the bottom-left corner of the first slot—into a product identifier (e.g., a SKU value, a UPC value) of a first product assigned to the first slot; and implement optical character recognition techniques to read a target quantity of facings—for this product in this slot—from the shelf tag. The computer system can also retrieve a virtual representation of the first product based on this product identifier—such as in the form of a set of template images, a color model (e.g., a histogram of colors present on packaging of the product), and/or a symbol model (e.g., text, icons, or symbols present on packaging of the product), etc. representative of the first product—from a visual product library. Additionally or alternatively, the computer system can: query the planogram for an identifier of a product assigned to this first slot and then retrieve a visual representation of this first product from the visual product library; and/or query the planogram for a target quantity of facings of the first product assigned to this slot.

The computer system can then implement product unit detection techniques to detect and identify product units in the first slot region of the image depicting this first slot. For example, for each product unit detected in the slot, the computer system can: extract a set of features within a boundary of the product unit; and compare these features to the visual representation of the first product assigned to this first slot to either identify the product unit as a unit of the first product assigned to this first slot or identify the product unit as incorrectly stocked in the first slot. For example, the computer system accesses the first optical image (e.g., a color photographic image). The computer system can then extract the first set of optical features from the first region of the first optical image by: detecting a first product unit, of a first set of product units, in the first region of the color photographic image; and extracting the first set of optical features including a first set of color features from the first region of the color photographic image. The computer system can then identify the first product type by: accessing a first set of template features associated with the first product type; and identifying the first product unit as of the first product type in response to a correlation between features in the first set of color features and features in the first set of template features exceeding a threshold correlation. The computer system can then calculate an actual quantity of product facings of the first product present in the first slot based on a quantity of product units containing features matched to the visual representation of the first product.

The computer system can also calculate an actual quantity of misplaced product units present in the first slot based on a quantity of product units containing features distinct from (i.e., not matched to) the visual representation of the first product. Furthermore, the computer system can implement methods and techniques described above and in U.S. patent application Ser. No. 15/600,527 to compare features of these misplaced product units to visual representations of other products assigned to nearby slots in the inventory structure in order to identify these misplaced product units.

The computer system can then update the realogram of the inventory structure to reflect: the actual quantity of product facings of the assigned product; and the quantity of misplaced product units occupying the slot (i.e., the "inventory state" of the slot). (The computer system can similarly update a cell in a spreadsheet corresponding to the first slot with this derived inventory state and/or annotate the region of the image depicting this first slot with this derived inventory state.)

The computer system can repeat this process for each other slot detected on this shelf and can update the realogram (or the spreadsheet, the image) to reflect the current inventory state of the shelf accordingly. The computer system can also repeat this process for each other shelf detected on the inventory structure in order to update the realogram (or the spreadsheet, the image) to reflect the current inventory state of the inventory structure as a whole.

Therefore, the computer system can: extract product identifier and product facing information for a slot from a shelf tag in the image of the inventory structure and/or retrieve this information from a planogram of the inventory structure; and determine identities and quantities of product units occupying this slot based on these data.

The computer system can additionally or alternatively: retrieve a product identifier and product facing information for a slot from a planogram of the inventory structure or store more generally; and determine identities and quantities of product units occupying this slot based on these data.

The computer system can then record these identification and quantity data for slots on these shelves in a realogram, spreadsheet, or other data structure for the inventory structure.

8. Volumetric Definition Library

The computer system can also host or access a volumetric definition library containing a corpus of scaled, volumetric definitions of a population of products stocked in the store, as shown in FIG. 1.

For example, the volumetric definition library can store: a rectangular cuboid representation of a cereal box; a cylinder representation of a canned good; a contoured revolve representation of a water or soda bottle; a complex flat-bottom 3D representation of a detergent bottle; and a rectangular cuboid representation—with radiused vertical corners—of a toilet paper vacuum pack.

In this example, each volumetric definition can be annotated with product identifiers (e.g., SKU values) of the product types they represent and orientation labels for their target or preferred display orientations. For example, the volumetric definition of the cereal box can be labeled with: an upright axis extending normal to the two smallest opposing faces of the rectangular cuboid volumetric definition of the cereal box; and a facing axis extending normal to the two largest opposing faces of the rectangular cuboid volumetric definition of the cereal box. In another example, the volumetric definition of the canned good can include: an upright axis extending normal to two parallel faces of the cylindrical volumetric definition of the canned good; and no facing axis. In yet another example, the volumetric definition of the water or soda bottle can include: an upright axis extending along the revolve axis of the contoured revolve; and no facing axis. In another example, the volumetric definition of the detergent bottle can include: an upright axis extending normal to the flat bottom of the complex 3D volume; and a facing axis extending normal to one large face of the complex 3D volume that corresponds to the front of the detergent bottle. In another example, the volumetric definition of the toilet paper vacuum pack can include: an upright axis extending parallel to radiused vertical corners of the rectangular cuboid volumetric definition; and a facing axis extending normal to the two largest opposing faces of the rectangular cuboid volumetric definition of the toilet paper vacuum.

In one implementation, the computer system can access a volumetric definition library by a manufacturer and/or supplier for volumetric definitions of a particular set of products by the manufacturer and/or supplier. In particular, the computer system can: retrieve a first volumetric definition of a first product type by retrieving the first volumetric definition of the first product type from a manufacturer database including a set of volumetric definitions for a set of product types. Upon retrieving the volumetric definition, the computer system can store the volumetric definition in a local volumetric definition library in Block S143. In the event that a product packaging for a product is updated by the manufacturer, the computer system can access the manufacturer/supplier volumetric definition library at regular intervals (e.g., once per week, once per month) or irregular intervals to maintain a current volumetric definition library.

Thus, throughout operation, the computer system can retrieve volumetric definitions from the volumetric definition library and compare these volumetric definitions to product units detected in a radar scan in order to identify both the product types and orientations of these product units.

9. Data Alignment

Block S130 of the method S100 recites aggregating a first set of radar scans captured by the robotic system during the scan cycle into a first composite radar scan. Generally, in Block S130, the computer system can: aggregate radar scans captured by the robotic system while traversing an inventory structure (e.g., one shelf, one shelving segment, multiple shelving segments, or an entire shelving structure) during the scan cycle; and fuse these radar scans into one composite radar scan of the inventory structure. The computer system can then align this composite radar scan to the image (e.g., the composite image) of this inventory structure, such as based on a known offset between the radar scanning module and the camera on the robotic system.

10. Product Quantity/Obfuscated Product Units

The computer system can then detect product units in the composite radar scan and compare these product units to volumetric definitions stored in the volumetric definition library in order to identify product units present on shelves in the store but not visible photographic images, such as due to obfuscation by shelving and other product units at the front of these shelves.

10.1 Product Unit Delineation

In one implementation, the computer system: selects a first slot on a first inventory structure in the store; retrieves a composite radar scan of the inventory structure; and isolates a slot volume of the composite radar scan corresponding to this slot. For example, the computer system can: detect shelf faces above and below this slot in the composite radar scan and/or in the corresponding image; define the vertical span of the slot volume of the composite radar scan extending between these shelf faces; project locations of shelf tags detected in the image onto the composite radar scan; define the lateral span of the slot volume of the composite radar scan extending between two adjacent shelf tags (such as with a lateral buffer of 10% of the slot width on each side of the slot); detect the rear of the inventory structure in the composite radar scan (or retrieve a depth of the inventory structure from the planogram or other inventory structure database); and define the longitudinal span of the slot volume of the composite radar scan from the adjacent shelf face to the rear of the inventory structure (or extending from the shelf face by the depth of the inventory structure).

The computer system can then scan this slot volume of the composite radar scan for a set of discrete, contiguous faces and group adjacent faces in the slot volume to define boundaries around individual product units present in the slot. For example, the computer system can implement blob detection to delineate individual product units within the slot volume of the composite radar scan.

10.2 One Slot: Volumetric Definition Available

In one implementation, the computer system then accesses an identifier of a particular product assigned to this slot, such as: a product identifier assigned to the slot by the planogram of the inventory structure; or a product identifier read from a shelf tag—corresponding to this slot—detected in the image of the inventory structure. Accordingly, the computer system retrieves a volumetric definition of this product from the volumetric definition library.

Then, for a first product unit detected in the slot volume of the composite radar scan, the computer system can compare the volumetric definition of the product to the volumetric representation of the first product unit. For example, the computer system can: extract a volumetric representation of the product unit from the slot volume of the composite radar scan; virtually rotate the volumetric definition of the product through a range of orientations relative to the product unit; and thus calculate or identify a particular orientation of the volumetric definition that minimizes an offset distance between a 3D surface defined by the volumetric definition and the volumetric representation of the product unit (hereinafter the "aligned orientation"). Then, if this minimum offset distance between the volumetric definition of the product and the volumetric representation of the product unit in the aligned orientation is less than a threshold offset, the computer system can confirm a volumetric match between the product and the product unit and calculate a high confidence that the product unit is a unit of the product.

Furthermore, with the volumetric definition of the product aligned to the volumetric representation of the product unit according to the aligned orientation, the computer system can project the upright axis and/or the facing axis from the volumetric definition of the product onto the product unit in the composite radar scan. The computer system can then: calculate an angular offset between the upright axis projected onto the product unit and a shelf axis extending normal to the surface of the shelf represented below the product unit in the composite radar scan; verify that the product unit is upright (or likely upright) if this angular offset is approximately 0° (e.g., +/−10°); and otherwise flag the product unit as overturned. Similarly, the computer system can: calculate an angular offset between the face axis projected onto the product unit and a shelf face axis extending normal to the face of the shelf; verify that the product unit is facing outwardly from the shelf (or likely facing outwardly from the shelf) if this angular offset falls within a threshold range (e.g., 0°+/−20°); and otherwise flag the product unit as disordered.

In another implementation, the computer system can extract a volumetric representation of a set of product units detected in the slot volume. In particular, the computer system can segment the first volumetric representation by the first volumetric definition to calculate the first quantity of the first set of product units occupying the first slot by, for each product unit in the first set of product units: detecting a border of the product unit in the first radar scan; calculating a nearest alignment of the first volumetric representation of the first product type to the border of the product unit in the first radar scan in Block S142; identifying the product unit as of the first product type in Block S144 in response to a distance between the first volumetric representation of the first product type and the border of the product unit falling below a threshold distance; and, in response to identifying the product unit as of the first product type, incrementing the first quantity of product units of the first product type.

Additionally or alternatively, in order to segment the first volumetric representation by the first volumetric definition, the computer system can: extract a first volumetric representation from a first radar scan by extracting a first group of points, intersecting a first slot volume and representing a first set of product units, from the first radar scan. The computer system can then segment the first volumetric representation by the first volumetric definition for the first product type by: extracting a first cluster of points representing a first product unit in the first set of product units from the first group of points; aligning the first cluster of points to the first volumetric definition of the first product type; calculating a first total error between the first cluster of points and product packaging surfaces defined by the first volumetric definition of the first product type; calculating a first similarity score between the first product unit and the first product type based on the first total error; and, in response to the first similarity score exceeding a threshold similarity, identifying the first product unit as of the first product type, and incrementing the first quantity of product units of the first product type occupying the first slot. Accordingly, the computer system can calculate an actual quantity of product units of the first product type present in the first slot based on a quantity of product units matching a volumetric representation of the first product type.

Conversely, if the minimum offset distance between the volumetric definition of the product and the volumetric representation of the product unit in the aligned orientation is more than the threshold offset and/or the similarity score falls below the threshold similarity, the computer system can detect a poor volumetric match between the product and the product unit and calculate a low confidence that the product unit is a unit of the product. In particular, the computer system can segment the first volumetric representation by the first volumetric definition to calculate the first quantity of the first set of product units occupying the first slot by, for each product unit in the first set of product units: identifying the product unit of other than the first product type in Block S144 in response to the distance between the first volumetric representation of the first product type and the border of the object exceeding the threshold distance; in response to identifying the product unit as of other than the first product type, incrementing a second quantity of product units misstocked in the first slot; and including updating the stock record to reflect the second quantity of product units misstocked in the first slot in Block S150.

Additionally or alternatively, in order to identify the product unit as other than the first product type, the computer system can extract the first volumetric representation from the first radar scan by extracting a first group of points, intersecting a first slot volume and representing a first set of product units, from the first radar scan. The computer system can then segment the first volumetric representation by a first volumetric definition for the first product type by: extracting a first cluster of points representing a first product unit in the first set of product units from the first group of points; aligning the first cluster of points to the first volumetric definition of the first product type; calculating a first total error between the first cluster of points and product packaging surfaces defined by the first volumetric definition of the first product type; calculating a first similarity score between the first product unit and the first product type based on the first total error; and, in response to the first similarity score falling below a threshold similarity, identifying the first product unit as distinct from the first product type, and flagging the first slot for removal of misstocked product units. Accordingly, the computer system can calculate a quantity of product units of other than the first product type present in the first slot (for example, if a store associate mistakenly places a set of product units in the first slot or places the set of products in the first slot due to an overflow of products from an adjacent slot, or a customer changes her mind about purchasing a product and replaces the product in a slot different from its initial slot) based on a quantity of product units not matching a volumetric representation of the first product type.

In one example, the computer system can: confirm a front product unit of the first set of product units as of the first product type; and identify product units positioned behind the front product unit (i.e., obscured from view by the robotic system) as distinct from the first product type. In one example, a front product unit in the first slot on the inventory structure can be properly stocked, while a second product unit behind the front product unit may be improperly placed in the first slot (e.g., a customer chooses to purchase a bag of chips, placing it into her cart, and later changes her mind, therefore removing the bag from her cart and placing it on a different inventory structure in another aisle of the store). In this implementation, the computer system can: extract a second cluster of points representing a second product unit in the first set of product units from the first group of points; align the second cluster of points to the first volumetric definition of the first product type; calculate a second total error between the second cluster of points and product packaging surfaces defined by the first volumetric definition of the first product type; calculate a second similarity score between the second product unit and the first product type based on the second total error; and, in response to the second similarity score falling below the threshold similarity, identify the second product unit as distinct from the first product type and flag the first slot for removal of misstocked product units.

Additionally or alternatively, in order to identify the misstocked product units as of a second product type (e.g., of an adjacent slot to the first slot), the computer system can: retrieve a second volumetric definition of a second product type assigned to a second slot adjacent the first slot; extract a second volumetric representation of a second set of product units intersecting the second slot volume in the first radar scan including extracting a second group of points, intersecting the second slot volume and representing the second set of product units, from the first radar scan; extract a second cluster of points representing a second product unit in the second set of product units from the second group of points; align the second cluster of points to the second volumetric definition of the second product type; calculate a second total error between the second cluster of points and product packaging surfaces defined by the second volumetric definition of the second product type; calculate a second similarity score between the second product unit and the second product type based on the second total error; in response to the second similarity score exceeding the threshold similarity, identify the second product unit as of the second product type; and increment for a second quantity of product units of the second product type occupying the second slot.

Accordingly, the computer system can: retrieve an identifier of a second product assigned to an adjacent slot by the planogram, specified in an adjacent shelf tag, or detected in an adjacent slot in the image of the inventory structure; retrieve a second volumetric definition of this second product; and repeat the foregoing methods and techniques to predict whether the product unit in the slot volume of the composite radar scan is a unit of the second product.

Furthermore, upon detecting a poor match between the product unit and the second product, the computer system can repeat this process for additional products stocked in the store, such as for all products: assigned to the same shelf or detected in the image of the shelf; assigned to the same inventory structure or detected in the image of the inventory structure; assigned to the same aisle or detected in images of inventory structures in the same aisle; or stocked throughout the entire the store.

(In one variation, upon comparing this product unit to volumetric definitions of every product stocked in the store, the computer system can flag the product unit as a foreign product unit and serve a prompt to a store associate to retrieve and discard the product unit.)

Therefore, the computer system can: calculate a volumetric occupancy grid that represents discrete shelves or product sections within the composite radar scan; divide this volumetric occupancy grid into volumetric sections, each representing an individual slot in the inventory structure; and divide each volumetric section into volumetric subsections based on known volumetric definitions of product types assigned to corresponding slots such that each volumetric subsection represents a minimum volumetric bound of a possible product unit of product type assigned to this slot.

10.2 One Slot: High Shelf Order

However, if product units in the slot are well-ordered (e.g., canned goods stacked and nested; cereal boxes aligned and tightly grouped; toilet paper packs stacked and nested), boundaries between discrete product units may not be well-delineated or distinguishable based on data in the composite radar scan.

Therefore, in one variation, the computer system can extract a volumetric representation of a product unit detected in the slot volume of the composite radar scan corresponding to the slot and divide this volumetric representation by the volumetric definition of the product assigned to the slot. If this result is approximately an integer value (e.g., 0.95-1.05; 1.95-2.05; 2.95-3.05; etc.), the computer system can: round this result to a nearest integer value; interpret the product unit as representing a quantity of units of the product equal to the integer value; and divide the product unit into a quantity of (approximately) identical subvolumes equal to this integer value. The computer system can then implement methods and techniques described above: to determine whether a volumetric representation of each of these subvolumes approximates the volumetric definition of the product assigned to the slot; and to predict whether each subvolume is a product unit of the product.

10.3 One Slot: Volumetric Definition Not Available

Alternatively, in the foregoing implementation, if the volumetric definition of a product is not available in the volumetric definition library, the computer system can instead: identify a particular product unit—in the image of the inventory structure—verified as a unit of a product assigned to the slot; project a boundary of the particular product unit from the image onto the composite radar scan; isolate a particular product unit in the composite radar scan that falls within or nearest this projected boundary and nearest the front of the shelf; extract a volumetric representation of this particular product unit from the composite radar scan; store this volumetric representation as a volumetric definition of the particular product in the volumetric definition library; and label this volumetric definition of the particular product with an identifier (e.g., a SKU value) of the particular product.

In particular, the computer system can: dispatch a robotic system to autonomously navigate along the first inventory structure within the store during a first scan cycle, the robotic system configured for capturing the first optical image of the first inventory structure. The computer system can retrieve the first volumetric definition of the first product type by, during a second scan cycle preceding the first scan cycle, dispatching the robotic system to: autonomously navigate along the first inventory structure within the store; capture a second optical image of the first inventory structure; and capture a first sequence of radar line scans. The computer system can then: assemble the first sequence of radar line scans into a second radar scan of the first inventory structure; detect a border of a first product unit occupying the first slot in the second optical image; identify a second volumetric representation in the second radar scan intersecting the border of the first product unit in the second optical image; generate the first volumetric definition of the first product type based on the second volumetric representation in the second radar scan; and associate the first volumetric definition with the first product type.

In this implementation, the computer system can also extract an orientation of particular product unit from the image (e.g., based on an orientation of a constellation of features depicting this product unit in the image) and tag the volumetric definition of the particular product with this orientation. The computer system can then implement this volumetric definition of the particular product to identify other units of this particular product in this slot.

In this implementation, the computer system can: implement similar methods and techniques to extract volumetric data of product units—also identified in images of inventory structures—from composite radar scans of inventory structures; and then update, augment, or replace volumetric definitions of the products in the volumetric definition library based on these volumetric data. The computer system can thus update the volumetric definition library over time reflect changes in sizes and geometries of products and product packaging over time by fusing image and radar captured by the robotic system during a scan cycle.

10.4 Product Class/Category Count

Furthermore, different products in the same product category—such as canned foods, canned beverage, and boxed cereals—may share similar or standardized packaging sizes and geometries. In particular, while these product types may be distinguishable via visual product packaging features, such as color, text, and other iconography, these product types may not be distinguishable by size or geometry data represented in the composite radar scan. Therefore, the composite radar scan may not contain data sufficient to distinguish different product types within the same product category.

Thus, in one variation as shown in FIG. 1, rather than compare the product unit detected in the composite radar scan to a volumetric definition associated with a particular product that defines geometry similar or identical to other products in the same product category, the computer system can instead: retrieve a generic volumetric definition of this product category; and implement the foregoing methods and techniques to verify whether this generic volumetric definition falls within a threshold offset of the volumetric representation of the product unit in the composite radar scan. Upon confirming that this generic volumetric definition falls within the threshold offset of the volumetric representation of the product unit, the computer system can confirm that the product unit is a product unit of one of the products sharing this geometry (i.e., rather than a product unit of a particular product type).

For example, if a first product type is associated with a unique product packaging and if the computer system matches a volumetric definition of the first product type to a volumetric representation of a first product unit detected in the composite radar scan, the computer system can: identify the first product unit as a unit of the first product type (or calculate a high confidence that the first product unit is a unit of the first product type); and tag the first product unit in the composite radar scan with a first product identifier of the first product type. However, if a second product type is associated with a product packaging common to or standardized among a group of product types within one product category (e.g., 32-ounce canned goods), and if the computer system matches a volumetric definition of this group of products to a second product unit detected in the composite radar scan, the computer system can: identify the second product unit as a unit of a product type in this group of product types (or calculate a high confidence that the product unit is a unit of a product type in this group of product types); and tag the second product unit in the composite radar scan with an identifier of the group of product types.

10.5 Similar Products

Similarly, some product types may exhibit similar geometries that differ by magnitudes near or less than the resolution of the composite radar scan (e.g., two millimeters), such as 10.5-ounce, 11.3-ounce, and 12-ounce aluminum-canned beverages. Additionally or alternatively, the orientation of a product unit on a shelf or relative to the radar sensor when scanned by the robotic system may limit resolution of a distinguishing volumetric feature of the product unit in the composite radar scan such that the resulting composite radar scan contains insufficient data or data resolution to enable the computer system identify the particular product type of this product unit.

Therefore, the volumetric definition library can define associations between products exhibiting similar geometries (e.g., 10.5-ounce, 11.3-ounce, and 12-ounce aluminum-canned beverages). Then upon identifying a volumetric definition of a first product type that falls within the threshold distance of the volumetric representation of a product unit in a composite radar scan, the computer system can: calculate a confidence score that this product unit is a unit of the first product inversely proportional to the distance between the volumetric definition of the first product type and the volumetric representation of the product unit; and query the library for a second set of products associated with geometries similar to the first product type. Then, the computer system can repeat the foregoing process to calculate confidence scores that the product unit is a unit of each product in the second set of products. Accordingly, the computer system can: tag the product unit in the composite radar scan with a product identifier and a corresponding confidence score for each of the first product and the second set of products; or tag the product unit with a product identifier for a particular product—of the first product and the second set of products—associated with a greatest confidence score.

10.6 Repetition Across Slot, Shelf, and Inventory Structure

The computer system can repeat the foregoing process for each other product unit detected in the slot volume of the composite radar scan corresponding to the first slot in the first inventory structure in order to tag each of these product units with: a product identifier of a particular product; a confidence score that the product unit is a unit of the particular product; an identifier of a group of products exhibiting the same or similar geometry; and/or an orientation of the product unit. The computer system can then repeat this process for each other slot on the shelf, for each other shelf in the inventory structure, and/or for each other inventory structure in the store.

10.7 Entire Shelf

In one variation, the computer system can similarly: isolate a slot volume of the composite radar scan representing an entire shelf; detect product units in this slot volume of the composite radar scan; retrieve volumetric definition of product types assigned to slots in this shelf; and then implement methods and techniques described above to compare these volumetric definitions to individual product units in order to identify types and orientations of these product unit distributed across the shelf (e.g., rather than occupying individual slots, such as for a highly-disorder shelf).

However, the computer system can implement any other method or technique to identify product units in slots, on shelves, and in inventory structure throughout the store based on 3D geometries of these product units represented in radar scans captured by the robotic system during the scan cycle.

11. Slot Metrics

The computer system can then derive slot metrics from these image-based and radar-based inventory data for slots throughout the store and write these metrics to a realogram of the store, as shown in FIG. 1. Furthermore, the planogram of the store and/or shelf tags throughout the store can assign target total quantities, target quantities of product facings, and target orientations of product units of particular products to these slots. The computer system can detect deviations from these target conditions and flag individual slots in the realogram accordingly for restocking or reordering.

In one implementation, for a particular slot, the computer system: derives a quantity of product facings of the product type assigned to the slot and the orientations of these facings based on an image of the slot, as described above; annotates a representation of this slot in the realogram with this quantity of product facings and their orientations; and flags this slot representation if the detected quantity of product facings and/or their orientations deviate from a target quantity and target orientation of this product type designated in the realogram (or on the corresponding shelf tag). In particular, the computer system can: for each product unit in a first set of product units: detect an orientation of the product unit in a first slot of a first radar scan; and, in response to the orientation of the product unit differing from a target orientation of the product units in the first slot, generate a prompt to investigate the first set of product units in the first slot.

Similarly, the computer system can: count a total quantity of product units—detected within a slot volume of a composite radar scan corresponding to this slot—tagged with a product identifier of the particular product assigned to the slot; write this total quantity to the slot representation in the realogram; and flag this slot representation if the detected total quantity of product units deviate from the target total quantity of this product type designated in the realogram (or on the corresponding shelf tag).

Furthermore, the computer system can: count a total quantity of product units—detected within the slot volume of the composite radar scan corresponding to the slot and/or within the 2D region of the image depicting the slot—tagged with a product identifier other than the identifier of the particular product assigned to the slot; and flag this slot representation if the detected quantity of incorrect product units is non-zero.

The computer system can also: write a quantity of ordered product units to the slot representation based on a quantity of product units labeled as upright and facing outwardly from the shelf in the slot volume of the composite radar scan corresponding to the slot; write a quantity of disordered product units to the slot representation based on a quantity of product units labeled as overturned or disordered in this slot volume of the composite radar scan; and flag the slot representation if the quantity of disordered product units is non-zero. In particular, the computer system can: calculate an alignment of the first volumetric representation of the first set of product units to the first slot volume; identify the first set of product units as disorderly based on a distance between the volumetric representation of the first set of product units and the first slot volume exceeding a threshold distance; generate a prompt to reorganize the first set of product units on the first inventory structure; and transmit the prompt to a computing device of a store associate.

In one variation, the computer system can also derive metrics related to longitudinal spacing between product units in the slot, such as: maximum, minimum, and average longitudinal distances between opposing faces of product units approximately parallel to the adjacent shelf face in the slot volume of the composite radar scan depicting this slot; a longitudinal spacing variance of longitudinal distances between these opposing faces of these product units in the slot volume of the composite radar scan; and a facing distance from the front face of a first product unit in the slot to the shelf face depicted in the slot volume of the composite radar scan (or in a depth map of the inventory structure). Similarly, the computer system can derive metrics related to lateral spacing between product units in the slot, such as: maximum, minimum, and average lateral distances between analogous (e.g., "like," similar, approximately-parallel) faces of product units approximately perpendicular to the adjacent shelf face in the slot volume of the composite radar scan; and a lateral spacing variance of these lateral distances between these analogous faces of these product units. The computer system can then tag or annotate the slot representation in the realogram with these orderliness and product unit distribution metrics.

The computer system can additionally or alternatively quantify a "slot orderliness" of the slot (e.g., on a scale from 0.000 to 1.000), such as inversely proportional to: the longitudinal spacing variance; the maximum longitudinal distance; the lateral spacing variance; the maximum lateral distance; the orientation variance; and/or the quantity of disordered product units in the slot. The computer system can then write this slot orderliness to the slot representation in the realogram and/or flag the slot representation as disordered if this slot orderliness value falls below a threshold value (e.g., 0.800).

The computer system can repeat this process for other slots represented in the realogram.

12. Restocking Prompts

The computer system can then generate restocking prompts for slots throughout the store based on the foregoing slot metrics.

For example, the computer system can generate a prompt to restock a slot with additional units of an assigned product type if the corresponding slot representation in the realogram indicates that: a total quantity of product facings detected in the slot is less than a target quantity of product facings assigned to the slot; or the total quantity of product units detected in the slot is less than the target total quantity of product units assigned to the slot.

In another example, the computer system can generate a prompt to restock a slot with additional units of an assigned product type if the computer system detects an empty portion of the slot based on volumetric representation of a first set of products of the assigned product type occupying the slot in a radar scan. In particular, the computer system can: calculate an empty slot volume based on a difference between a first volumetric representation of the first set of products and a first slot volume of the first slot; segment the empty slot volume by a first volumetric definition of the assigned product type to define a restock quantity of the product type at the first slot; and flag the first slot for restocking in response to the restock quantity exceeding a restock threshold.

In another example, the computer system can generate a prompt to reorganize product units in a slot if the corresponding slot representation in the realogram indicates that a unit of a product different from a particular product assigned to the slot was detected in the slot.

In yet another example, the computer system can generate a prompt to bring product units in a slot forward toward the adjacent shelf face if the corresponding slot representation in the realogram indicates that a maximum longitudinal distance between two adjacent product units in the slot exceeds a threshold distance (e.g., 30 millimeters) and/or if the longitudinal spacing variance for product units in the slot exceeds a threshold variance.

In another example, the computer system can generate a prompt to reorganize product units in a slot if the corresponding slot representation in the realogram is labeled with a slot orderliness value less than a threshold value.

The computer system can then transmit these prompts to store associates, such as in real-time during the scan cycle. Additionally or alternatively, the computer system can aggregate these prompts into a global restocking list and later transmit this global restocking list to these store associates, such as before or during a scheduled restocking period in the store.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for maintaining perpetual inventory within a store comprises:
   accessing a first radar scan of a first inventory structure within a store;
   locating a first slot volume defining a first slot in the first radar scan;
   retrieving a first volumetric definition of a first product type expected in the first slot;
   extracting a first volumetric representation of a first set of product units intersecting the first slot volume in the first radar scan;
   segmenting the first volumetric representation by the first volumetric definition to calculate a first quantity of the first set of product units occupying the first slot; and
   updating a stock record of the store to reflect the first quantity of the first set of product units occupying the first slot.

2. The method of claim 1, wherein locating the first slot volume defining the first slot in the first radar scan comprises:
   detecting in the radar scan:
      a first product unit;
      a first shelf face below and adjacent the first product unit; and
      a second shelf face above the first product unit;
   correlating a vertical plane at a distal limit of the radar scan with a back of the shelf;
   defining a slot width of the first slot centered on and encompassing a width of the first product unit; and
   defining the first slot volume bounded by:
      the first shelf face;
      the second shelf face;
      the slot width; and
      the back of the shelf.

3. The method of claim 1:
   further comprising:
      accessing a first optical image of the first inventory structure;
      detecting the first shelf tag in the first optical image; and
      extracting a first product identifier for the first product type, designated by the first shelf tag, from the first shelf tag; and
   wherein locating the first slot volume defining the first slot in the first radar scan comprises:
      projecting a location of the first shelf tag in the first optical image onto the first radar scan; and
      defining the first slot volume relative to the location of the first shelf tag projected onto the first radar scan.

4. The method of claim 1, wherein retrieving the first volumetric definition of the first product type expected in the first slot comprises:
   querying a planogram of the store for a product type assigned to the first slot;
   receiving a first product identifier, of the first product type, assigned to the first slot by the planogram of the store; and
   retrieving the first volumetric definition, associated with the first product identifier, from a database of volumetric definitions.

5. The method of claim 1:
   wherein extracting the first volumetric representation from the first radar scan comprises extracting a first group of points, intersecting the first slot volume and representing the first set of product units, from the first radar scan; and wherein segmenting the first volumetric representation by the first volumetric definition comprises:
  extracting a first cluster of points representing a first product unit in the first set of product units from the first group of points;
  aligning the first cluster of points to the first volumetric definition of the first product type;
  calculating a first total error between the first cluster of points and product packaging surfaces defined by the first volumetric definition of the first product type;
  calculating a first similarity score between the first product unit and the first product type based on the first total error; and
  in response to the first similarity score exceeding a threshold similarity:
    identifying the first product unit as of the first product type; and
    incrementing the first quantity of product units of the first product type occupying the first slot.

6. The method of claim 1:
wherein extracting the first volumetric representation from the first radar scan comprises extracting a first group of points, intersecting the first slot volume and representing the first set of product units, from the first radar scan; and
wherein segmenting the first volumetric representation by the first volumetric definition comprises:
  extracting a first cluster of points representing a first product unit in the first set of product units from the first group of points;
  aligning the first cluster of points to the first volumetric definition of the first product type;
  calculating a first total error between the first cluster of points and product packaging surfaces defined by the first volumetric definition of the first product type;
  calculating a first similarity score between the first product unit and the first product type based on the first total error; and
  in response to the first similarity score falling below a threshold similarity:
    identifying the first product unit as distinct from the first product type; and
    flagging the first slot for removal of misstocked product units.

7. The method of claim 1, further comprising:
calculating an alignment of the first volumetric representation of the first set of product units to the first slot volume;
identifying the first set of product units as disorderly based on a distance between the volumetric representation of the first set of product units and the first slot volume exceeding a threshold distance;
generating a prompt to reorganize the first set of product units on the first inventory structure; and
transmitting the prompt to a computing device of a store associate.

8. The method of claim 1, further comprising:
calculating an empty slot volume based on a difference between the first volumetric representation and the first slot volume;
segmenting the empty slot volume by the first volumetric definition to define a restock quantity of the first product type at the first slot; and
flagging the first slot for restocking in response to the restock quantity exceeding a restock threshold.

9. The method of claim 1, wherein segmenting the first volumetric representation by the first volumetric definition to calculate the first quantity of the first set of product units occupying the first slot comprises, for each product unit in the first set of product units:
  detecting a border of the product unit in the first radar scan;
  calculating a nearest alignment of the first volumetric representation of the first product type to the border of the product unit in the first radar scan;
  identifying the product unit as of the first product type in response to a distance between the first volumetric representation of the first product type and the border of the product unit falling below a threshold distance; and
  in response to identifying the product unit as of the first product type, incrementing the first quantity of product units of the first product type.

10. The method of claim 1:
wherein segmenting the first volumetric representation by the first volumetric definition to calculate the first quantity of the first set of product units occupying the first slot further comprises, for each product unit in the first set of product units:
  identifying the product unit of other than the first product type in response to the distance between the first volumetric representation of the first product type and the border of the object exceeding the threshold distance; and
  in response to identifying the product unit as of other than the first product type, incrementing a second quantity of product units misstocked in the first slot; and
further comprising updating the stock record to reflect the second quantity of product units misstocked in the first slot.

11. The method of claim 1, further comprising, for each product unit in the first set of product units:
  detecting an orientation of the product unit in the first slot of the first radar scan; and
  in response to the orientation of the product unit differing from a target orientation of the product units in the first slot, generating a prompt to investigate the first set of product units in the first slot.

12. The method of claim 1, further comprising:
retrieving a target quantity of the first product type assigned to the first slot;
in response to the quantity of the first product type falling below the target quantity by more than a threshold difference, generating a prompt to restock the first slot in the first inventory structure; and
transmitting the prompt to a computing device affiliated with a store associate.

13. The method of claim 1, further comprising:
detecting a first shelf face in the first radar scan;
detecting a first cluster of points representing a front face of the first product unit, in the first set of product units occupying the first slot, in the first radar scan;
calculating a first plane intersecting the first cluster of points;
calculating an angular offset between the first plane and the first shelf face;
in response to the angular offset exceeding a threshold offset:
  characterizing the first slot as disorganized; and
  generating a prompt to reorganize the first slot in the first inventory structure; and
transmitting the prompt to a computing device of a store associate.

14. The method of claim 1, further comprising:
detecting a first cluster of points representing a volume of a first product unit in the first radar scan;
extracting a target cluster of points from the volumetric definition of the first product unit;
projecting the target cluster of points onto the first cluster of points;
calculating a transform between the first cluster of points and the target cluster of points;
calculating a skew offset based on the transform;
in response to the skew offset exceeding a threshold skew offset:
  characterizing the first slot as disorganized; and
  generating a prompt to reorganize the first slot in the first inventory structure; and
transmitting the prompt to a computing device of a store associate.

* * * * *